United States Patent [19]

Filter et al.

[11] 3,957,551
[45] May 18, 1976

[54] PROPELLANT COMPOSITIONS HAVING CARBOXYL CONTAINING BINDER CURED WITH A GLYCIDYL THIOETHER

[75] Inventors: Harold E. Filter, Midland; Don L. Stevens, Sanford, both of Mich.

[73] Assignee: The Dow Chemical Company, Midland, Mich.

[22] Filed: Dec. 17, 1971

[21] Appl. No.: 209,441

[52] U.S. Cl. .............................. 149/19.5; 149/19.6; 149/19.9; 149/20; 149/44
[51] Int. Cl.² ......................................... C06D 5/06
[58] Field of Search ................ 149/19, 60, 61, 76, 149/83, 44, 20, 19.6, 19.5, 19.9

[56] References Cited
UNITED STATES PATENTS

| 3,278,352 | 10/1966 | Erickson | 149/19 |
| 3,305,523 | 2/1967 | Burnside | 149/19 X |
| 3,467,558 | 9/1969 | Wernette et al. | 149/19 |
| 3,476,622 | 11/1969 | Harada et al. | 149/19 |
| 3,589,954 | 6/1971 | Filter et al. | 149/19 |

*Primary Examiner*—Benjamin R. Padgett
*Assistant Examiner*—Edward A. Miller
*Attorney, Agent, or Firm*—Bruce M. Kanuch

[57] ABSTRACT

Disclosed is a solid propellant composition in the form of a munition which comprises an inorganic acid salt in intimate combination with the reaction product of a carboxyl bearing polymer and a glycidyl thioether. The composition is prepared by mixing the oxidizer, carboxyl containing polymer, and glycidyl thioether and curing the resulting mixture to a coherent grain. Unexpectedly, an excellent cure is achieved in the presence of the oxidizer.

9 Claims, No Drawings

PROPELLANT COMPOSITIONS HAVING CARBOXYL CONTAINING BINDER CURED WITH A GLYCIDYL THIOETHER

BACKGROUND OF THE INVENTION

The present trend in the solid propellant industry is toward the use of carboxyl containing polymers, e.g. carboxyl modified butadiene polymers, in cure in place binder systems. Studies have shown that in order to make major improvements in the mechanical properties of propellants based on low molecular weight carboxyl modified polymers, it is necessary to use polymers with functional groups in a known position, preferably in a terminal position, rather than randomly distributed along the polymer chain. Accordingly, the carboxyl terminated polybutadiene (CTPB) prepolymer is desirable for use in solid propellants. However, no completely satisfactory curing agent has been found in CTPB. Epoxy resins cure the carboxyl bearing polymers in the absence of certain oxidizers but when acid salts such as $MNO_3$, $MClO_4$ or $MClO_3$ where M is a metal or metal-like cation are added, a poor cure results. Since these oxidizers are normally included in a solid propellant, a curing agent which achieves a good cure in their presence is needed. Propellant grains prepared from a CTPB polymer cured with a trifunctional aziridine, such as tris[1-(2-methyl)aziridinyl] phosphine oxide (MAPO), exhibit desirable processability, strength and flexibility properties. However, such aziridine cured CTPB propellants do not meet stability requirements due to their susceptibility to cure reversion.

We have discovered that the use of a glycidyl thioether as curing agent for CTPB provides a composition which cures to a tough coherent grain in the presence of an inorganic acid salt as oxidizer without significant cure reversion.

SUMMARY OF THE INVENTION

The present invention is a solid propellant composition in the form of a cured munition. The composition comprises an inorganic acid salt as oxidizer in intimate combination with the reaction product of a carboxyl containing polymer and a glycidyl thioether having the formula

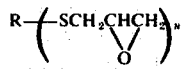

where R is an organic radical and n is 2, 3 or 4. The composition is prepared by mixing the oxidizer and carboxyl bearing polymer with the glycidyl thioether and curing the mixture to a coherent grain.

PREFERRED EMBODIMENTS

Those polymers which can be reactively modified so as to contain carboxyl groups and be employed in the present invention include polyisoprenes, polyesters, polyglycols and polybutadienes. Preferably, the polymer will be a polybutadiene terminated with carboxyl groups. The polymer's molecular weight will normally range from 200 to 10,000 with a molecular weight of from 1500 to 5000 being preferred.

The carboxyl bearing polymer is, in one embodiment, a polymer in which at least some of the recurring monomeric units contain carboxyl groups. The polymer can be a homopolymer of a carboxyl-bearing monomer such as polymethacrylic acid. However, it may be desirable to employ a polymer which is a copolymer of a carboxyl bearing monomer with another monomer chosen for its contribution to the physical properties of the total polymer but not to contribute to reactivity. Terpolymers, of whose three monomeric starting materials one or more bear carboxyl groups, can be used.

The identity of the carboxyl bearing moiety and of other moieties copolymerized therewith to obtain a copolymer or terpolymer is not critical provided the resulting polymer contains reactive carboxyl groups. A wide variety of polymers having terminal, pendant, or both terminal and pendant free acid groups may be cured with glycidyl thioethers as disclosed in the instant application. The carboxyl bearing polymers may be prepared by any of the standard solution, bulk or emulsion polymerization techniques. The acid groups may be present on the polymer chains as formed or may be grafted on a suitable polymer backbone.

Carboxyl terminated polybutadienes having properties especially suitable for use in the present invention are obtained commercially as General Tire and rubber's Telegen or Thiokol's HC-434.

Preferred glycidyl thioethers are those which correspond to the formula

where n is 3 and R is an aliphatic, aromatic, cycloaliphatic or arylalky containing up to 20 n carbon atoms. Examples of preferred glycidyl thioethers are compounds of the formula:

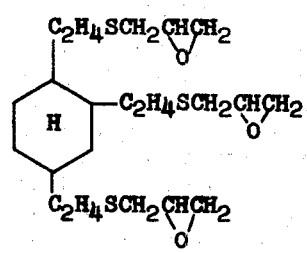

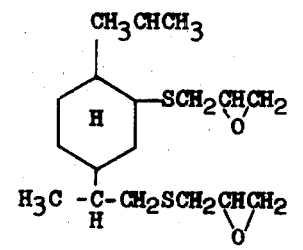

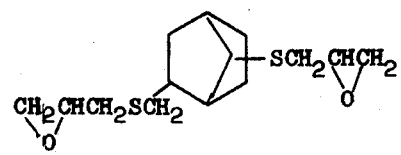

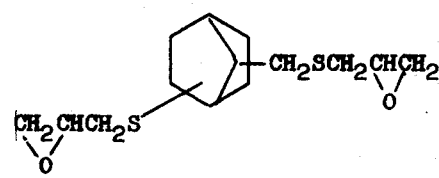

or

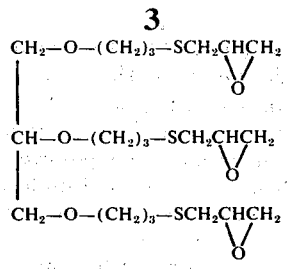

The glycidyl thioether or trivinylcyclohexane is the preferred species of curing agent. The epoxide to carboxyl equivalent ratio ranges from 0.5/1 to 2.25/1 with a ratio of 0.75/1 to 1.25/1 being preferred.

The present binder system oxidizer combination can be used in fabricating propellant grains having fuels selected from a wide variety of materials. For example particulate metal fuels such as aluminum, beryllium, and lithium; light metal hydrides such as lithium hydride, aluminum hydride, beryllium hydride, lithium aluminum hydride and organic nitrogen-hydrogen fuels having high N/C ratios such as triaminoguanidinium azide, 5-aminotetrazole, amino triaminotetrazine or hydrazine azide may be used as fuels to provide thrust as in a rocket engine. The composition may also be used as a propellant for dispersing various agents such as fumigants, herbicides, fungicides and smoke dye particles into the atmosphere.

The solid propellant is normally formulated so as to contain on a weight basis 3–40 percent binder fuel, 1–90 percent oxidizer and 1–90 percent fuel. Preferred amounts are 10–20 percent binder fuel, 60–80 percent oxidizer and 10–20 percent fuel.

The invention is further illustrated by the following examples.

EXAMPLE I

In order to determine the relative efficiency with which CTPB could be cured in the presence of oxidizers, a glycidyl thioether and a sulfur containing glycidyl ether were employed as curing agents in the presence of ammonium perchlorate (AP) as oxidizer. In each run, ten gram mixes of oxidizer and binder were prepared in which the CTPB was Thiokol HC-434. The ratio of epoxide to carboxyl equivalents was 1:1. The results of these experiments are outlined in Table I.

Table I

Cure Study of Sulfur Containing Glycidyl Ethers in Presence of Solid Propellant Oxidizer

| Curing Agent[a] | Oxidizer | Temperature, °C | Gel Time, hrs. |
|---|---|---|---|
| I | None | 60 | 12 (excellent cure) |
| I | AP | 60 for 48 hours then 80 | 168 (poor cure) |
| II | None | 50 | 10 (excellent cure) |
| II | AP | 50 | 10 (excellent cure) |
| II | Hydrazinium diperchlorate | 50 | 10 (excellent cure) |

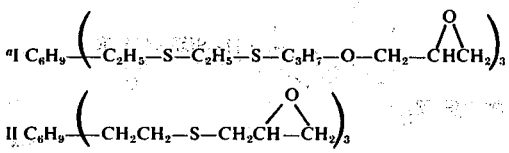

Although the sulfur in the glycidyl ether (Compound I) functioned as a catalyst to give a good elastomer in 12 hours, the presence of AP interferred with the cure mechanism apparently causing some homopolymerization of the glycidyl ether.

EXAMPLE II

Because of concern expressed over the oxidative stability of propellants cured with sulfur containing compounds, a thioglycidyl ether cured carboxyl terminated polybutadiene propellant containing AP and aluminum was tested at 80°C. for over 3 months. The Shore A hardness of the propellant remained constant for the duration of the test with no visable change being noticeable in the samples.

EXAMPLE III

A study of the physical properties of solid propellants based on CTPB cured with glycidyl thioethers was conducted. The following two curing agents were evaluated:

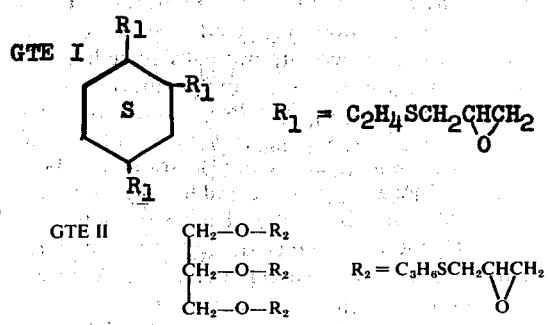

The control compounds used in the evaluation were methyl aziridinyl phosphine oxide (MAPO) and the reaction product of trimesic acid and 2-ethyl aziridine (TAEA). Several propellant batches were prepared in which the combination of propellant binder polymer (CTPB) and propellant binder curing agent (GTE) accounted for 16 weight per cent, the fuel accounted for 16 weight per cent and the oxidizer accounted for 68 weight per cent of the composition. The propellants were prepared at an epoxide/carboxyl equivalent ratio of 1.25/1.0. The propellants were cast into a JANAF specimen mold and cured for 48 hours at 80°C. The cured samples were removed from the mold and cut into tensile specimens which were tested on an Instron Tensile Tester at a 2.0 inch per minute strain rate to determine tensile strength and elongation.

The physical properties of the CTPB propellants before and after aging for 3 months at 80°C. are compared at ambient temperature and −65°F. in Table II. The data in Table II show the MAPO cured propellant to have the best initial tensile strength at both ambient temperature and −65°F. Difficulties were encountered in measuring the low temperature properties of the MAPO propellants as the strength of the propellant samples exceeded the range of the load cell being used and data exceeded the limits of 830 psi tensile strength and 20 percent elongation. However, the MAPO cured propellant was quite sticky after 2 weeks thermal aging and was too soft and sticky to measure after 4 weeks aging, showing that cure reversion had occurred.

The initial tensil strength of the GTE I cured propellant compared favorably with the TAEA cured control. In addition, the flexibility (elongation) of the GTE I cured propellant was significantly better than the TAEA (56.7 percent vs. 39.3 percent) at ambient temperature and slightly better (15.5 percent vs. 12.8 percent) at −65°F. The GTE II cure propellant had borderline tensile strength and lower elongation at ambient temperature. The −65°F. properties of the GTE I cured propellant were similar to those of the GTE II and the TAEA cured propellant.

The properties of all the propellants showed significant changes after 3 months aging at 80°C. The MAPO cured propellant showed the greatest change. At ambient temperature the TAEA cured propellant increased in tensile strength (218 psi vs. 145 psi) and decreased in elongation (39.3 percent vs. 11.7 percent).

The results of these experiments are summarized in Table II.

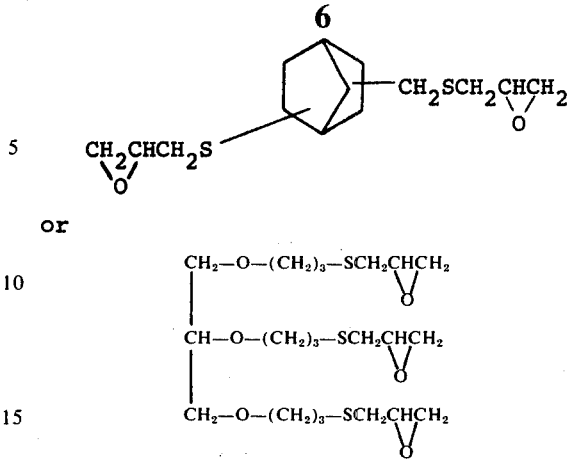

or

TABLE II

Effect of Thermal Aging of Physical Properties of CTPB Propellants

| Curing Agent | Test Temp. | Initial Physical Properties | | Physical Properties After Aging | |
|---|---|---|---|---|---|
| | | Tensile Str., psi | Elongation percent | Tensile Str., psi | Elongation percent |
| MAPO (Control) | Ambient | 197 | 27.2 | Too soft to measure after 2-4 weeks | |
| | −65°F | >830 | >20.0 | | |
| TAEA (Control) | Ambient | 145 | 39.3 | 218 | 11.7 |
| | −65°F | 660 | 12.8 | 633 | 8.5 |
| GTE I | Ambient | 119 | 56.7 | 136 | 4.3 |
| | −65°F | 600 | 15.5 | 518 | 9.6 (11.5)*a* |
| GTE II | Ambient | 100 | 19.4 | 130 | 4.2 |
| | −65°F | 563 | 18.1 | 466 | 9.5 (12.8)*a* |

*a*Propellants had yield points, elongations given at optimum tensile and at break.

We claim:

1. A solid propellant composition in the form of a cured grain which comprises an inorganic chlorate, nitrate or perchlorate as oxidizer in intimate combination with the reaction product of a carboxyl containing polyisoprene, polyester, polyglycol or polybutadiene with a glycidyl thioether selected from the group consisting of

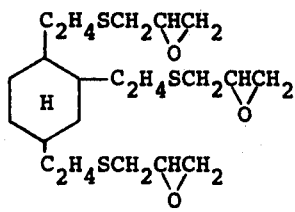

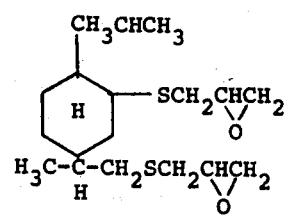

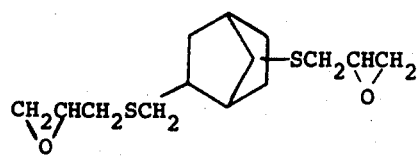

said composition being further described in that it is prepared by mixing the oxidizer, carboxyl containing polymer and glycidyl thioether, wherein the organics are present in amounts sufficient to provide an epoxide to carboxyl equivalent ratio of from 0.5/1 to 2.25/1, with subsequent curing the resulting mixture to a coherent grain.

2. The composition of claim 1 which contains 3–40 percent binder fuel, 1–90 percent oxidizer in combination with a fuel, said fuel comprising from 1–90 percent of the composition.

3. The composition of claim 1 wherein the carboxyl containing polymer has a molecular weight of from 200 to 10,000.

4. The composition of claim 1 wherein the carboxyl containing polymer is carboxyl terminated polybutadiene with a molecular weight of from 1500 to 5000.

5. The composition of claim 2 which contains particulate aluminum, beryllium or lithium as fuel.

6. The composition of claim 2 which contains particulate lithium hydride, aluminum hydride, beryllium hydride or lithium aluminum hydride as fuel.

7. The composition of claim 1 wherein the glycidyl thioether is the glycidyl thioether of trivinylcyclohexane.

8. The composition of claim 2 which contains 10–20 per cent binder fuel, 60–80 per cent oxidizer and 10–20 percent fuel.

9. The composition of claim 1 wherein the epoxide to carboxyl equivalent ratio is from 0.75:1 to 2.25:1.

* * * * *